United States Patent [19]

Dewitz et al.

[11] Patent Number: 4,731,228

[45] Date of Patent: Mar. 15, 1988

[54] REACTOR AND HORIZONTAL CYCLONE SEPARATOR WITH PRIMARY MASS FLOW AND SECONDARY CENTRIFUGAL SEPARATION OF SOLID AND FLUID PHASES

[75] Inventors: Thomas S. Dewitz, Houston; John E. Gwyn, Katy; Wesley A. Parker, Houston; Donald E. Hardesty, Brookshire, all of Tex.

[73] Assignee: Shell Oil Company, Houston, Tex.

[21] Appl. No.: 874,966

[22] Filed: Jun. 16, 1986

[51] Int. Cl.$^4$ .......................... B01J 8/24; B01D 45/12
[52] U.S. Cl. .................................... 422/144; 422/147;
55/391; 55/392; 55/452; 55/459 R; 55/459.1;
208/161
[58] Field of Search ................ 422/144, 147; 208/153,
208/161

[56] References Cited

U.S. PATENT DOCUMENTS

| | | | |
|---|---|---|---|
| 1,953,948 | 4/1934 | Biéth | 183/80 |
| 2,103,809 | 12/1937 | Biéth | 183/90 |
| 2,888,096 | 5/1959 | Evans | 183/80 |
| 2,901,420 | 8/1959 | Evans | 208/153 |
| 3,177,634 | 4/1965 | Latham et al. | 55/236 |
| 3,366,247 | 11/1968 | Visman | 210/512 |
| 3,392,513 | 7/1968 | Hedin | 55/425 |
| 3,633,344 | 1/1972 | Erlangen et al. | 55/452 |
| 3,802,570 | 4/1974 | Dehne | 210/304 |
| 4,043,899 | 8/1977 | Anderson et al. | 208/161 |
| 4,205,965 | 6/1980 | Bielefeldt | 55/1 |
| 4,206,174 | 6/1980 | Heffley et al. | 422/144 |
| 4,212,653 | 7/1980 | Giles . | |
| 4,305,738 | 12/1981 | Vinaty | 55/459 R |
| 4,312,650 | 1/1982 | Seki et al. | 55/452 |
| 4,313,910 | 2/1982 | Dries et al. | 422/147 |
| 4,426,359 | 1/1984 | Woebcke et al. | 422/147 |
| 4,455,220 | 6/1984 | Parker et al. | 208/161 |
| 4,457,082 | 7/1984 | Kreft et al. | 34/57 |

FOREIGN PATENT DOCUMENTS 541472 4/1956 Italy .................................. 55/459 R Primary Examiner—David L. Lacey
Attorney, Agent, or Firm—Kimbley L. Muller

[57] ABSTRACT

The invention here disclosed is a novel apparatus and method for the separation of solid and fluid phases in a horizontal elongated cyclone separator with a novel inclined solid dropout continuous and uninterrupted slot in the bottom to transfer a solid phase via primary mass separation from either an upflow or a downflow reactor in the initial portion of the cyclone separator to a downcomer which may be equipped with a stripping function. The instant horizontal elongated cyclone separator is constructed to ensure an elongated helical flow path of the vapor phase with a minor portion of the catalyst particles therein from one end of the cyclone separator to a withdrawal conduit to disengage via secondary centrifical separation a minor portion of the solid phase from the fluid phase. The minor portion of the solid phase is thereafter transmitted to the stripping function by a vertical downcomer interconnecting the stripping function and the bottom of the horizontal elongated cyclone separator. The entire apparatus is constructed so that the tangential velocity of the fluid across the upper section or lower section of the reactor tube divided by the superficial axial velocity of fluid across the cross section of the withdrawal conduit is greater than 0.2 which guarantees formation of the vortex in the horizontal elongated cyclone separator.

10 Claims, 6 Drawing Figures

4,731,228

REACTOR AND HORIZONTAL CYCLONE SEPARATOR WITH PRIMARY MASS FLOW AND SECONDARY CENTRIFUGAL SEPARATION OF SOLID AND FLUID PHASES

FIELD OF THE INVENTION

This invention relates to a process and an apparatus for separating solid materials from fluid phase materials in a convenient manner whereby the two-phases are first separated by a primary mass flow separation, and thereafter, the resultant fluid phase, with a minority of entrained solids, is treated to recover, via secondary centrifugal separation forces, nearly all of the quantity of solid materials not originally excised by the primary mass flow separation. This invention is concerned with any process in which solid particles necessitate separation from a fluid phase and an apparatus to accomplish such a task. The most preferred use of this apparatus is in conjunction with a riser reactor employed in a fluid catalytic cracking (FCC) process to selectively channel and segregate solid catalytic particles from gaseous hydrocarbon products or a gasiform phase. Other uses comtemplated for this type of apparatus include a pressure feeder device, any device necessitating a stripping function of solid particles or in the preparation of synfuels, such as in a coal gasification process scheme.

In the field of FCC units, the use of zeolite cracking catalysts has evolved which requires short fixed contact times of the catalyst and reactants. Cyclone separation, a well known and crowded art area, has thus taken on a new role in gasoline productivity and catalyst regeneration abilities. Even with current advances in this area, numerous problems regarding rapid vapor/catalyst disengagement remain to be solved.

The advantages of the instant vapor/catalyst disengagement apparatus include a high tolerance of backflow, a lowering of pressure drop throughout the vessel, a light loading in the downstream parts of the cyclonic separator, a high separation efficiency, a short vapor residence time, an ability to handle high solids loading, and possession of a smaller and easier cyclonic separation device to retrofit into existing FCC units. The resultant process benefits derivative of these advantages include a greater gasoline yield, a less pronounced gasoline density gradient, a faster feed vaporization, a lower gas mix and an improved flexibility of operation.

The instant apparatus is designed as an elongated, yet relatively short and stubby, cyclonic separation device which will necessitate much less volume for high temperature reactors and not demand the presence of a great quantity of head room. In fact, 50 to 60% of the head room of a vertical cyclonic separator can be eliminated; a fortiori, the ability to retrofit is readily apparent.

A disadvantage of utilizing a stripping gas in a vessel in open communication with a cyclonic separator is backflow problems of the stripping gas passing up through the cyclonic separator. The use of the instant helical secondary centrifugal separation device, and especially use of the preferred vortex stabilizing unit, will vitiate or at least mitigate ubiquitous backflow problems. Thus, stripping can occur in this apparatus even with the stripper in open communication with the cyclone separation function. This will eliminate the necessity to use cyclone diplegs to coordinate the separation and the stripping functions of the respective vessels.

BACKGROUND OF THE INVENTION

A cyclonic separator was disclosed in U.S. Pat. No. 3,392,513, Hedin, with a spiral inlet portion and exit (for clean gas) with discharge dampers for emptying dust collecting bins which thereby permits continuous operation of the separator. In 1980, U.S. Pat. No. 4,205,965 issued to Bielefeldt for an apparatus for eliminating dust particles from a gas having a lighter density than the particles. Essentially, the admixture is charged to a bent channel and partially introduced into a whirling chamber which takes advantage of primary eddy flows, circular secondary eddy flows and sink flows. The primary eddy flow is accelerated approximately 300 times the acceleration created by gravity by the combination of a tangential curved wall through the flow channel extending over the entire chamber height. The concentrated sink flow is maintained in the central portion of the whirling chamber and is substantially localized due to suction pipes in communication with operative fans. Two U.S. patents issued to Bieth, U.S. Pat. Nos. 2,103,809 and 1,953,948, disclose an apparatus which utilizes angular velocity of solid particles to separate the same from a gaseous material. Essentially, the gas is charged to a circular flow path in admixture with the solid materials, which during acceleration are transmitted to a trench overlaying a conical funnel. The gases continue throughout the apparatus and exit therefrom through a longitudinal situated outlet port.

In Visman, U.S. Pat. No. 3,366,247, a cyclonic apparatus is disclosed wherein solids charged to the cyclone are separated from a gas by imparting to the suspension centrifugal accelerations or the order of 300 to 400 times the acceleration of gravity. A feed inlet pipe communicates tangentially with the separation chamber which contains a tubular vortex finder. The granular materials fall to the bottom of the cyclone separator while an overflow discharge pipe extracts water flow separated from the granular material. In Latham et al U.S. Pat. No. 3,177,634, an apparatus is disclosed for the recovery of solids from gas in which a deflector cone separates a helical gas stream to cause fluid droplets to be deflected against the wall of the cyclone separator and thereby removal of the fluid gases through louvers situated in a direction opposite in flow from the helical gas motion.

In Evans U.S. Pat. No. 2,888,096, a horizontal centrifical separator is disclosed wherein primary mass separation and secondary cylindrical separation are utilized within a horizontal cyclone separator (but absent an inclined slot solid dropout means interconnecting the upstream portion of the horizontal cyclone separator and a vertical downcomer attached to the relative opposite end or downstream end of the cyclonic separator). See also Evans U.S. Pat. No. 2,901,420. In U.S. Pat. No. 4,455,220, Parker et al, catalyst and hydrocarbon vapors are separated in a vertical cyclone separation zone by use of a vortex stabilizing means which separates the cyclone zone from the stripping zone and allows stripping gas from the stripping zone to be passed upwardly into the cyclone zone countercurrent to the downflow of separated catalyst. This improves both the separation and stripping of the gaseous hydrocarbons from the separated catalyst and reduces the catalyst hydrocarbon contact time, thereby improving gasoline yield and olefin content.

The instant invention is an improvement upon the Parker et al apparatus because it possesses a higher tolerance for the backflow of stripping gases and eliminates the necessity for a right angle turn atop the riser reactor feeding the applicable cyclonic separation device. In addition, the instant cyclonic separation device attains fast separation of heavy solid loaded-admixtures in the very front part of the cyclone separator, which results in the downstream or secondary centrifugal separator operating in a light load manner despite the initial high inlet loadings of the cyclonic separator. The prior art fails to recognize the combinative primary mass flow and secondary centrifugal separation mechanisms with the inclined slot solid dropout means to pass the majority of the catalyst therethrough to the bottom of a downcomer vertical conduit interconnecting a stripping zone at the other extreme.

OBJECTS AND EMBODIMENTS

It is an object of this invention to provide an efficient horizontal cyclone separator with high load and stripping capabilities to separate solid particles from a fluid phase.

It is another object of this invention to provide a horizontal cyclone separator having two different and unique separatory mechanisms for separation of solid catalyst particles from a fluid phase, which mechanisms comprise first, a primary mass flow separation, and second, a centrifugal separation and disengagement of the entrained solid particles from the fluid phase.

It is another object of this invention to devise an elongated horizontal cyclone separator which can be retrofitted into existing FCC hydrocarbon processing units.

Another object of this invention is to provide a functioning horizontal cyclone separator which vitiates the necessity for solid catalyst particles to undergo a right angle turn atop a riser reactor to feed a cyclone separator via a horizontal tee joint connection means.

Another object of this invention is to provide a horizontal cyclone separator capable of separating high mass loadings of catalyst particles in the initial stages of the cyclone separator, such that the latter stages of the cyclone separator operate in a relatively light load capacity.

Another object of this invention is to provide a novel horizontal cyclone separator which can function to segregate catalyst particles from hydrocarbon products derived from a downflow tubular reactor in a manner such that the angular velocity of the solid particles results in the solid particles dropping out via an inclined slot solid dropout means while the remaining portion of catalyst particles becomes disengaged from the hydrocarbonaceous product vapor by means of establishing a helical flow path of the vapors from a far end of the horizontal cyclone separator to the vapor outlet of the horizontal cyclone separator situated at the other extreme of the separator.

One embodiment of this invention resides in an apparatus for the separation of solid and fluid phases which comprises a horizontal elongated vessel having a body comprising an imperforate top, a first imperforate side wall, a bottom and a second perforate sidewall for penetration of a fluid phase outlet withdrawal conduit; an elongated tubular reactor interconnecting a portion of said bottom of said vessel at a position off center from the center of said bottom as defined by a vertical plane passing through the diameter of said horizontal body for passage of an admixture of said solid phase with said fluid phase into said elongated vessel; a downcomer elongated relatively vertical conduit interconnecting said vessel bottom at the relatively far end of said vessel opposite interconnection of said vessel bottom with said elongated tubular reactor for passage downward through said downcomer vertical conduit of a relatively small amount of said solid phase; a fluid phase outlet withdrawal conduit situated in said second perforate sidewall of said vessel juxtaposed to said tubular reactor interconnection for the continuous removal of said fluid phase after secondary centrifugal separation from said solid phase; an inclined slot solid dropout means interconnecting said bottom of said vessel at a position juxtaposed to said tubular reactor interconnection with said vessel bottom for the primary mass separation of said solid phase from said fluid phase by centrifugal acceleration of said solid phase about an angle in said horizontal vessel, wherein said solid particles are accelerated against said horizontal elongated body of said vessel to cause separation of said solid phase from said fluid phase and to pass the majority of said solid phase through said inclined solid dropout means to said downcomer vertical conduit; and wherein said withdrawal conduit, horizontal vessel and said tubular reactor are constructed to insure that the diameter of said withdrawal conduit is smaller than the diameter of said horizontal vessel and said off center ingress of said solid and fluid phases into said elongated vessel through the diameter cross section of said tubular reactor froms a swirl ratio of greater than 0.2 defined by the tangential velocity of said fluid into said horizontal vessel divided by the superficial axial velocity of said fluid through said withdrawal conduit to form a vortex of said fluid phase in a helical path extending from said first imperforate wall opposite said fluid withdrawal conduit and extending in a helical flow path to exit through said fluid withdrawal conduit and to cause secondary centrifugal separation and disengagement of entrained solid phase from said helical fluid phase and thereby passage of said disengaged solid phase to the point of interconnection of said solid vessel with said downcomer vertical conduit to pass said disengaged and separated solid phases downward through said downcomer conduit.

Another embodiment of this invention resides in an apparatus for separating gaseous hydrocarbonaceous materials from solid fine catalytic particles in a hydrocarbon reaction zone inclusive of (1) a riser reactor, (2) a cyclone separator and (3) a stripping zone containing a dense bed of said solid fine catalytic particles, which apparatus comprises a tubular elongated riser reactor through which hydrocarbon materials are passed upward and cracked in the presence of said solid fine catalytic particles and which communicates with a cyclone separator by discharge therein through the bottom of said cyclone separator at a situs off center with respect to a vertical plane passing through the center of said cyclone separator, wherein said cracked gaseous hydrocarbonaceous materials and solid fine catalytic particles pass upward through said riser reactor into said cyclone separator entering said cyclone separator at a centrifugal velocity to disengage a majority of said fine solid catalyst material from said gaseous hydrocarbonaceous material by primary mass flow separation; a cyclonic separator having a relatively horizontal axis, an off center inlet in the bottom of said cyclonic separator, a gaseous hydrocarbon materials outlet in one side wall of said cyclonic separator, an imperforate top in said cyclonic separator, a second side wall in said cyclonic separator which is imperforate, and an inclined slot solid dropout means situated juxtaposed with respect to the interconnection of said tubular elongated riser with said cyclonic separator and at a position to receive said disengaged fine solid catalyst particles by means of centrifugal velocity, said cyclonic separator being in interconnection with a vertical downcomer conduit at a locus substantially opposite to said interconnection of said cyclonic separator with said tubular reactor with respect to the horizontal axis of said cyclonic separator, said vertical downcomer conduit positioned to receive a minor portion of said fine solid catalytic particles disengaged via secondary centrifugal separation, wherein said cyclonic separator and tubular reactor are constructed such that the swirl ratio therein is greater than 0.2 which is defined by the tangential velocity of said hydrocarbonaceous materials across the cross section of said tubular elongated riser divided by the superficial axial velocity of said hydrocarbonaceous material across the cross section of said gaseous hydrocarbonaceous materials outlet, whereby maintaining said swirl velocity at greater than 0.2 forms a vortex of said hydrocarbonaceous materials in a helical path extending from said second side wall to said gaseous hydrocarbon material outlet to cause said secondary centrifugal separation and disengagement of said minor portion of said fine solid catalytic particles and thereby their passage downward through said vertical downcomer conduit; a stripping zone containing a relatively dense bed of solid fine catalytic particles received from both (1) said primary mass flow separation via said inclined slot solid dropout means and (2) said secondary centrifugal separation via said vertical downcomer conduit, said stripping zone interconnecting a downstream catalytic particle regeneration zone and said vertical downcomer conduit, wherein stripping gas is passed to said stripping zone by means of a stripping gas inlet means and wherein said helical flow path of said hydrocarbonaceous materials extending from said second side wall to said gaseous hydrocarbon material outlet prohibits at least a portion of said stripping gas from passing upward through said vertical downcomer conduit and into said cyclonic separator.

Another embodiment of this invention resides in an apparatus for the separation of solid and fluid phases comprising solid catalytic particles and a fluid phase comprising reactants and products, said apparatus comprising a horizontal elongated vessel having a body comprising a top, first imperforate sidewall, a bottom and a second perforate side wall for penetration of a fluid phase outlet withdrawal conduit; an elongated downflow tubular reactor interconnecting a portion of said top at a position off center from the center line of said top of said vessel as defined by a vertical plane through the diameter of said horizontal body for passage of an admixture of said solid catalytic particles and said fluid phase in a downward direction into said elongated vessel; a downcomer elongated relatively vertical conduit interconnecting said vessel bottom at the relatively far end of said vessel opposite interconnection of said vessel top with said elongated downflow tubular reactor for passage downward through said downcomer vertical conduit of a relatively small amount of said solid phase; a fluid phase outlet withdrawal conduit situated in said second perforate side wall of said vessel beneath and to the side of said interconnection of said elongated downflow tubular reactor with said top of said vessel for the continuous removal of said fluid phase after a secondary centrifugal separation from said solid catalytic particles; an inclined slot solid dropout means interconnecting said bottom of said vessel at a position at least 90° separated from said downflow tubular reactor interconnection with said top of said vessel as measured by the angle around the circumference of said vessel wherein 360° degrees equals one complete revolution around said circumference, said dropout means receiving solid catalyst particle by primary mass separation of solid catalyst particles from said fluid phase by centrifugal acceleration of said solid catalyst particles about said angle of at least 90° degrees in said horizontal vessel wherein said solid particles are accelerated against said horizontal circumference to cause primary mass flow separation and to thereby pass the majority of said solid catalyst particles through said inclined solid dropout means to said downcomer vertical conduit and wherein said withdrawl conduit, horizontal vessel and said downflow tubular reactor are constructed to insure that the diameter of said withdrawal conduit is smaller than the diameter of said horizontal vessel and said off center ingress of said admixture of said phases developes a swirl ratio of greater than 0.2 defined by the tangential velocity of said fluid across the cross section of said tubular reactor divided by the superficial axial velocity of said fluid through the cross section of said withdrawal conduit to form a vortex of said fluid phase in a helical path exteding from said imperforate wall opposite said fluid withdrawal conduit and extending in a helical flow path to exit through said fluid withdrawal conduit and to cause said secondary centrifugal separation and disengagement of entrained solid catalyst particles from said helical fluid phase and thereby passage of said disengaged solid phase to the point of interconnection of said vessel with said downcomer vertical conduit to pass said disengaged and separated solid particles through said downcomer conduit.

DETAILED DESCRIPTION OF THE DRAWINGS

Figure 1:
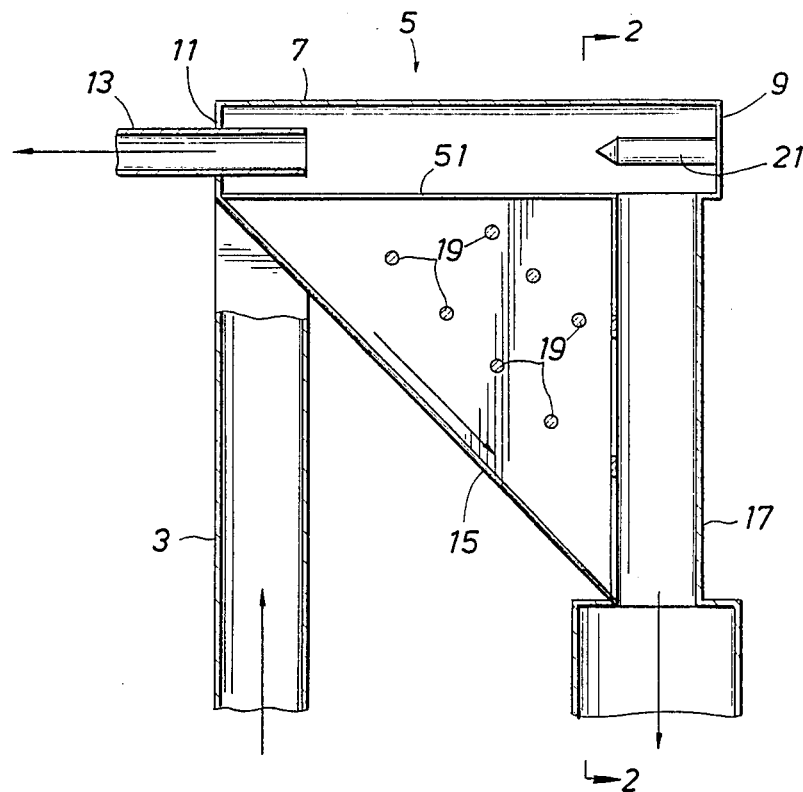
FIG. 1 is a side view of the horizontal cyclone separator of this invention.

FIG. 1 demonstrates a side view of the instant apparatus of this invention. The openings for the inclined slot solid dropout means and the catalyst entry into the downcomer elongated relatively vertical conduit can be seen in FIGS. 2, 3, 4 and 6. Fluid and solid particles are charged to a riser reactor 3 at the bottom of same for conversion of hydrocarbonaceous materials contained therein to hydrocarbonaceous products of smaller molecular size. After a relatively short and predetermined contact time, it becomes necessary to disengage the hydrocarbonaceous product from the catalytic materials. The horizontal cyclone separator 5 accomplishes this disengagement task. The horizontal cyclone separator is comprised of an imperforate top section 7 and an imperforate side member 9 with a second side member 11 being equipped with at least one aperture for penetration of at least one continuous fluid phase withdrawal conduit 13. It is preferred that this fluid phase withdrawal conduit occupies no less than the axial distance intercepted by the inlet to less than or equal that to the edge of downcomer conduit 17. The helical formation pattern of the fluid material will form on side wall 9 and continue uninterrupted into fluid phase withdrawal conduit 13. It is contemplated and preferred in this invention, but not absolutely necessary, that imperforate side member 9 is equipped with a vortex stabilizer in the shape of a spike or obelisk to guarantee formation and existence of a helical flow of fluid (vapor) material. A minority portion of solid catalyst particles is entrained in the helical fluid flow where secondary centrifugal separation forces act to disengage the solid catalyst particles from the helical-moving fluid phase.

It is necessary to form the instant helical flow path of vaporous or fluid material by maintaining a swirl ratio of greater than 0.2 in the horizontal cyclone separator. This swirl ratio is defined by division of the tangential velocity of the fluids passing into the horizontal vessel by the superficial axial velocity of the fluid through the withdrawal conduit. This ensures the helical vortex of the fluid phase. In furtherance of the fluid mechanics of this swirl ratio, the same is defined by the relationship of:

$$\frac{U_i}{V_i} = \frac{Re}{R_i} \times \frac{1}{F}$$

wherein
Re=the radius from the axis of the horizontal cyclone to the center line of the tubular reactor;
Ri=the radius of the fluid withdrawal conduit; and
F=the cross section area of the tubular reactor divided by the cross sectional area of the fluid withdrawal conduit.

Figure 2:
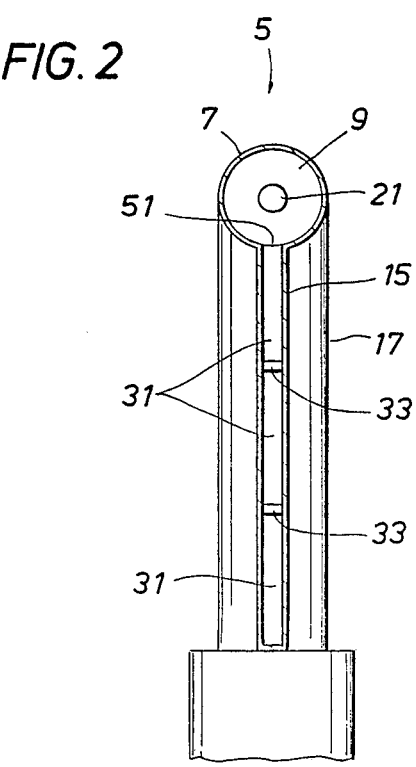
FIG. 2 is a cross section perspective looking along the lines 2—2 of FIG. 1.
Figure 4:
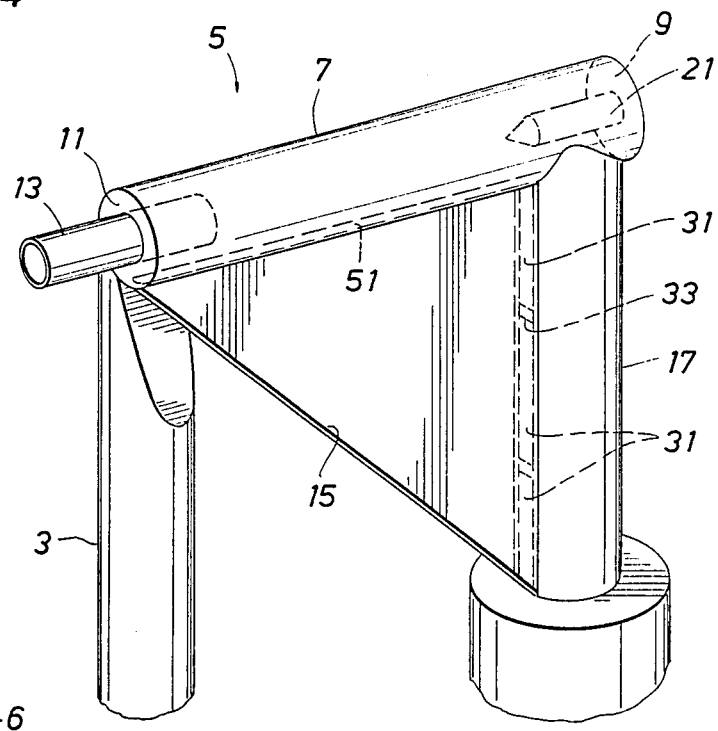
FIG. 4 is a perspective view showing the opening in the downcomer and the slot solids dropout means.

A majority of the solid particles are excised from the multiple solid and fluid phases by a primary mass flow separation of the materials. After this separation, a majority of these solids are passed by means of inclined slot solid dropout means 15 interconnecting the bottom of the horizontal cyclone separator and the downcomer vertical conduit 17. This open communication is shown in FIGS. 2 and 4. Support means such as tie rods 19 are provided in the three-dimensional vessel in order to ensure proper support throughout the total inclined slot solid dropout means. Vortex stabilizer 21 is attached to the imperforate wall of the horizontal cyclone separator, but again, is an optional component of this cyclone separator.

FIG. 2, a view alongside 2—2 of FIG. 1, shows downcomer vertical conduit 17 communicating with imperforate side 9 which in turn cummunicates with vortex stabilizer 21. Openings or aperatures 31 exemplify suitable catalyst entry means to the downcomer which is in open communication with the bottom of the horizontal cyclone separator. Adequate supports 33 are provided to ensure the integrity of the shown apertures.

Figure 3:
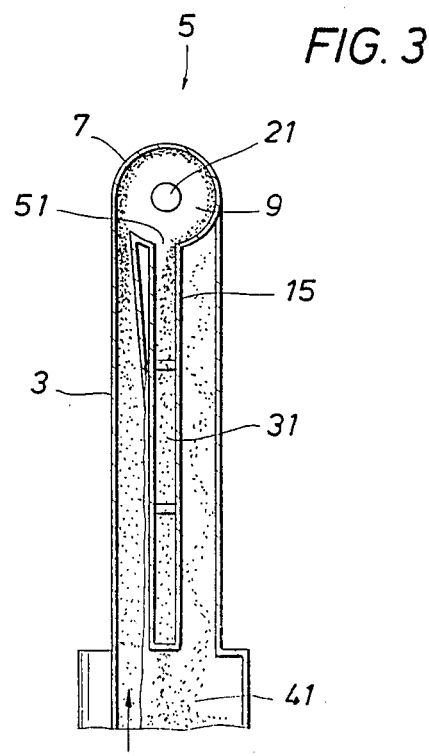
FIG. 3 is a cross section perspective looking at the short side of the horizontal cyclone separator.

FIG. 3 demonstrates the primary mass separation flow utilizing the centrifugal acceleration of the solid particles. The fluid and solid materials rise through riser reactor 3 and are passed against the side of horizontal separator 5 in an angular relationship such that catalyst particles are pinned and passed along the sides of the circular cyclonic separator over a passage of 270° before entering inclined slot solids dropout means 15. A portion of entrained catalyst, normally a minority portion, is separated by secondary centrifugal separation and then passed downward through vertical downcomer conduit 17 and into a relatively dense bed of catalyst contained in stripper section 41. FIG. 3 also shows entry of the upflow riser reactor at a position off center with respect to the vertical axis of the cyclonic separator. FIG. 4 is a perspective view showing the relative opening 51 in the bottom of cyclone separator 5 and intercommunication of same with vertical downcomer 17 via inclined slot solid dropout means 15 (openly communicating via aperatures 31 as referred to earlier in FIG. 2). A large majority of the solid catalyst particles pass from the horiontal cyclone separator to downcomer 17 by means of inclined slot solid dropout means 15. A minority of the catalyst particles is entrained in the vaporous phase, but will be quickly become disengaged by means of the vortex and secondary centrifugal forces existent in the horizontal cyclone separator. This minority share of catalysts pass through vertical downcomer 17 to a stripping bed of catalyst situated in the top of vertical downcomer conduit 17 and in open communication with the horizontal cyclone separator.

The bed of catalyst particles in the bottom of the vertical downcomer is referred to as a relatively dense phase of catalyst. These particles are contacted with a stripping gas, such as steam, to disengage any adsorbed hydrocarbonaceous materials on the surface of the catalyst particles to avoid further coking and thereby ease regeneration operations in the overall FCC system. In stripping steps of the past, extraneous stripping gas, such as steam or nitrogen, would rise from a point near the top or interface of the catalyst bed and, absent a cumbersome baffle or dipleg would flow into the horizontal cyclone separator. However, in this invention utilizing the inclined slot solid dropout means in conjunct interaction with the helical vortex, the stripping gas does not create adverse back flow effects normally encurred as a result of open communication of the stripping zone and the horizontal cyclone separator.

Figure 5:
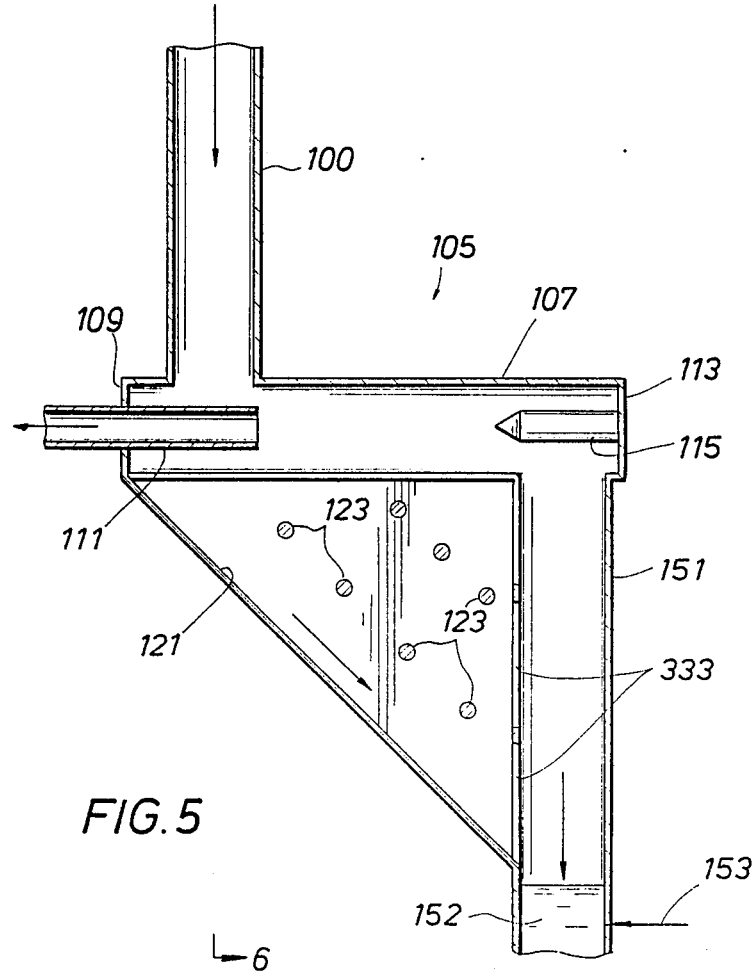
FIG. 5 is a side view of the horizontal cyclone separator in interconnection with a downflow tubular reactor.
Figure 6:
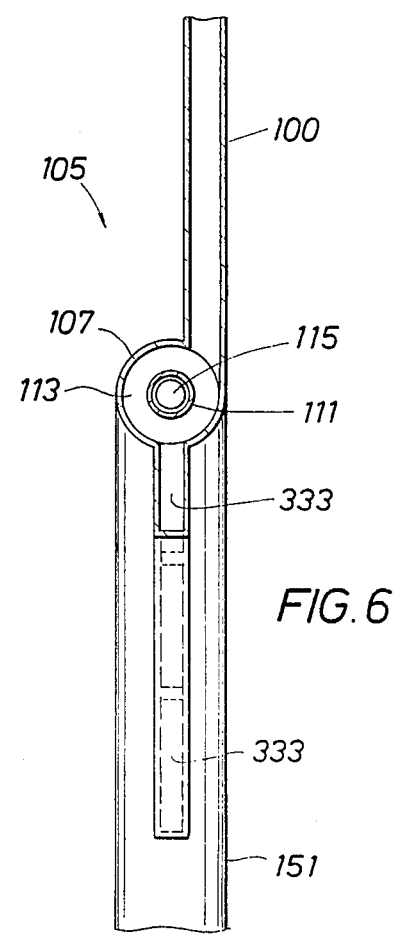
FIG. 6 is a cross section view perspective looking along the lines 6—6 of FIG. 5.

FIG. 5 is a side view of an FCC apparatus having a downflow tubular reactor. Communication between the bottom of the horizontal cyclone separator and the vertical downcomer (to the steam stripping section) is very similar to that of FIGS. 2 and 4 in the upflow riser reactor. In FIG. 5, a downflow tubular reactor 100 passes fluid and solid phase materials in a downward direction into the top of horizontal cyclone separator 105. This structure has a top 107 with at least one aperture present for entry of the downflow tubular reactor and at least one perforation in side 109 for insertion of fluid withdrawal conduit 111. Unlike the 270° turn in an annular direction of the catalyst particles in FIG. 1, FIG. 6 depicts a 90° turn before entry to inclined solids dropout means 121. Imperforate side 113 contains an optional vortex stabilizer 115 in the sahpe of a truncated cone or obelisk. The same swirl ratio must be maintained at greater than 0.2 in order to formulate the helical flow pattern of vapor initiating at imperforate side 113, containing a vortex stabilizer, and continuing in a horizontal direction in a vortex or cyclical flow path via fluid outlet conduit 111. Catalyst particles are charged to horizontal cyclone separator 105 at an off center location from downflow reaction 100 to inclined slot solids dropout means 121 into the opening of the downcomer 333. The inclined slot solid dropout means 121 is shown with tie rods 123 in order to provide physical integrity to the overall separation device. It is also contemplated that these supports may be evenly spaced from side to side of the cyclone separator in order to provide better support. A majority of the catalyst particles traverse inclined slot solid dropout means 121, while a minority of the catalyst pass by means of vertical downcomer 151 which also has stripping steam rising therethrough from stripping steam inlet 153 in relatively dense bed 152 of catalyst particles. Both embodiments here have shown one imperforate wall 9 or 113 at an extreme opposide the reactor inlet to the separator and a withdrawal conduit juxtaposed to the reactor inlet to the separator. It is completely within the confines of this invention tht the two entities be modified with respect to the reactor inlet. Imperforate sides 9 and 113 can be placed juxtaposed to the reactor inlet with the vapor withdrawal conduit being positioned at the opposite extreme to the reactor inlet and yet still have an equivalently functioning apparatus. The functioning combination of inclined slot solid dropout means 121 and the vortex formed within the interior of the cyclone separator, prevents or at least mitigates backflow problems resultant from stripping steam rising through the vertical downcomer and into the horizontal cyclone separator. This eliminates the necessity of a dipleg or baffle in any location throughout the cyclone separator unit.

ILLUSTRATIVE EMBODIMENT

In this illustrative embodiment, two FCC apparati were tested with a horizontal cyclone interconnecting a reactor and a regenerator. The apparatus was constructed of a transparent material so that the catalyst particles and fluid could be observed on a continuing basis from a point extraneous from inside the horizontal cyclone vessel. Fluidized cracking catalyst was used in accompaniment with air (substituted for normal hydrocarbons) and the separatory powers of the horizontal cyclone separator were observed.

Two different embodiments were undertaken, one with and one without a solid slot dropout means such as depicted in FIGS. 1-6. The first horizontal cyclone/stripper vessel was operated without a solid slot dropout means. A six inch diameter horizontal cyclone stripper was tested for pressure drop, solids separation efficiency and mass throughput capacity. This cyclone was fed with air and fluidized cracking catalysts through a 2.5" diameter vertical riser. The riser was connected to the cyclone through a 1.5" wide and 3.0" tall inlet of rectangular cross section into the bottom of the horizontal cyclone separator. A quantity of 50 lbs/min of 76 micron average size catalyst powder was conveyed with 150 scfm of air at near ambient temperature and pressure. About 6 scfm of stripping air was introduced simultaneously through the bottom of the 6" diameter down to simulate a stripping function. The horizontal cyclone exhibited high losses of about 1 to 2 lbs/min through the vapor overhead conduit and the pressure drop was considerably higher than theoretically predicted.

Visual observations through the transparent side of the first horizontal cyclone/stripper vessel confirmed that excessive catalyst accumulated in the body of the horizontal cyclone because of the combined effect of the weight of the catalyst and the adverse flow of the stripping vapor up through the downcomer from the interface of catalyst particles simulating stripping therein. Various attempts were made to eliminate accumulation of these catalyst particles such as modifying the helical inlet section, modifying the extended vapor outlet conduit and narrowing the tangential inlet to increase inlet velocity. None of these solutions resulted in a viable horizontal cyclone separator.

Unexpectedly, a long cut slot formation into the bottom of the horizontal cyclone separator connecting with the stripper-downcomer greatly reduced pressure drop and also reduced solids lost by a factor of $10^2$ to $10^3$. A 1" wide by 3" long solids dropout slot was cut into the bottom of the horizontal cyclone separator at a point juxtaposed to the riser reactor inlet to form a second horizontal cyclone/stripper vessel. The slot was connected directly to an opening of the solids downcomer by a 53° inclined chute. This solid slot dropout means is the same as depicted in FIGS. 1 through 4 of the instant drawings. Selective placement of the solids slot dropout means converted the horizontal cyclone separator from a singular type of separator to a plural two-stage separator. These stages include a first mass flow separation (of a majority of the catalyst particles through the dropout slot) and a second high efficiency centrifugal separation to eliminate entrained catalysts from the vapor via a helical vortex formed in an axial plane relatively parallel to the axial plane of the horizontal cyclone separator. The second horizontal cyclone separator reduced solids lost by a factor of $10^2$ to $10^3$ to about 2 grams per minute (0.01% weight at solids loading of about 50 lbs/min) at riser air velocities of 40 to 70 feet per sec at near ambient temperature and pressure. The pressure drop between the riser inlet and the vapor outlet was reduced to about 4 inches for 50 ft/sec riser velocity. Losses from the horizontal cyclone/stripper were primarily due to reentrainment by the stripper gas flowing in an upward direction through the vertical downcomer thereby disturbing the separation of the solids from the fluid material.

Several different vortex stabilizers with different geometries were inserted axially through the end of the horizontal cyclone separator opposite that of the vapor outlet conduit. This once again formed an imperforate side to the horizontal cyclone separator with the different vortex stabilizers secured thereto. It was found that the different vortex stabilizers reduced pressure drop 10 to 20% and improved the secondary separation efficiency of the catalyst and fluid phases, especially when the stripping gas flow rate exceeded 8% of the riser gas flow rate.

Several different combinations of the solid dropout slot means were tried with varying widths and lengths. It was determined that the narrowest slots were optimal at low gas and low solid flow rates. Narrow slots were also optimal at high gas flow rates but low solid loadings. Wide slots were found to be optimal for low gas but high solids flow rate. The widest slots were optimal for combined high gas and solids flow rates. As an example, with an 1 inch by 11 inch square slot in the 6 inch diameter horizontal cyclone separator with a riser reactor velocity of 70 ft/sec, more than 25 scfm of adverse stripping air was blown up the downcomer without increasing the magnitude of solid losses above the $10^2$ to $10^3$ times better efficiency vis-a-vis the first embodiment (no slot solids dropout means). The cyclone pressure drop with this particular 1 inch × 11 inch slot was 3.7". The mass mean particle diameter of the solid losses was 12 microns versus 76 microns for the circulating solids inventory.

This showing is very important, i.e. most refiners desire to operate at high mass loading conditions. The instant slot solid dropout means, when properly supported and configured in the horizontal cyclone separator acts to greatly reduce the quantity of lost catalyst particles, which would otherwise require an addition to the total catalyst inventory and which, if not removed by other cyclone separation means, would contaminate the vapor products and cause overcracking to undesired vapor and solid byproducts.

What is claimed is:

1. A reactor and separator apparatus for the separation of solid and fluid phases which comprises:
   (a) a horizontal elongated vessel having a diameter, a horizontal body comprising an imperforate top, a first imperforate side wall, a bottom having a center line and a second perforate side wall for penetration of a fluid phase outlet withdrawal conduit;
   (b) an elongated tubular reactor having a cross section diameter and interconnecting a portion of said bottom of said vessel at a position adjacent said second perforate side wall and off center from the center line of said bottom defining and off-center ingress as defined by a vertical plane through the diameter of said horizontal body for passage of an admixture of a solid phase admixed with a fluid phase into said horizontal elongated vessel;
   (c) a downcomer elongated relatively vertical conduit interconnecting said horizontal elongated vessel bottom adjacent said first imperforate side wall of said horizontal elongated vessel opposite interconnection of said vessel bottom with said elongated tubular reactor for passage downward through said downcomer elongated vertical conduit of a relatively small amount of the solid phase;
   (d) a fluid phase outlet withdrawal conduit having a diameter and situated in said perforate second side wall of said vessel juxtaposed to said elongated tubular reactor interconnection with said horizontal elongated vessel bottom for the continuous removal of the fluid phase after secondary centrifugal separation from the solid phase after passage through said vessel of the fluid phase to said imperforate end and reversal of the flow of the fluid phase in the opposite direction to said withdrawal conduit;
   (e) an inclined slot solid dropout means interconnecting said bottom of said horizontal elongated vessel and said downcomer elongated relatively vertical conduit to form a continuous opening along the entire bottom of said horizontal vessel for the primary mass separation of the solid phase from the fluid phase by centrifugal acceleration of the solid phase about an angle in said horizontal elongated vessel wherein the solid particles are accelerated against said horizontal body of said horizontal elongated vessel to cause primary separation of the solid phase from the fluid phase and to pass the majority of the solid phase through said inclined slot solid dropout means to said downcomer vertical conduit;
   (f) a structure support means in said inclined slot solid dropout means for support of said inclined slot solid dropout means; and
   (g) wherein said fluid phase withdrawal conduit, said horizontal elongated vessel and said tubular reactor are constructed to insure that the diameter of said fluid phase withdrawal conduit is smaller than the diameter of said horizontal elongated vessel and said off center ingress of the solid and fluid phases into said horizontal elongated vessel through the diameter cross section of said tubular reactor form a swirl ratio of greater than 0.2 as defined by the tangential velocity of the fluid into said horizontal elongated vessel divided by the superficial axial velocity of the fluid through said withdrawal conduit to form a vortex of the fluid phase in a helical flow path extending from said first imperforate side wall opposite said fluid phase withdrawal conduit and extending in a helical flow path to exit through said fluid phase withdrawal conduit and to cause secondary centrifugal separation and disengagement of entrained solid phase from the fluid phase and thereby passage of the disengaged solid phase to the point of interconnection of said horizontal elongated vessel with said downcomer vertical conduit to pass the disengaged and secondarily separated solid phase downward through said downcomer elongated vertical conduit.

2. The apparatus of claim 1 wherein said horizontal elongated vessel includes a vortex stabilizer in attachment with said first imperforate side wall to stabilize the helical flow of the fluid phase in a direction towards said fluid phase withdrawal conduit.

3. The apparatus of claim 1 wherein said structure support means comprise elongated tie rods situated transverse and interconnecting with said slot solid dropout means.

4. A reactor and separator apparatus for separating gaseous hydrocarbonaceous materials from solid fine catalytic particles which apparatus comprises:
   (a) a tubular elongated riser reactor having a cross section diameter through which hydrocarbon materials are passed upward and cracked in the presence of the solid fine catalytic particles and which communicates with a horizontal cyclone separator having a bottom with a center line and being discharge therein through the bottom of said horizontal cyclone separator at a situs not on said center line with respect to a vertical plane through the center of said cyclone separator, wherein cracked gaseous hydrocarbonaceous materials and solid fine catalytic particles enter said cyclone separator at a centrifugal velocity sufficient to disengage a majority of the fine solid catalyst particles from the gaseous hydrocarbonaceous materials by primary mass flow separation;
   (b) said horizontal cyclone separator having a relatively horizontal axis, an off center side inlet in said bottom of said horizontal cyclone separator, a gaseous hydrocarbon materials outlet in a first side wall of said horizontal cyclone separator, an imperforate top in said horizontal cyclone separator, an imperforate second side wall in said horizontal cyclone separator, and an inclined slot solid dropout means situated juxtaposed with respect to the interconnection of said tubular elongated riser with said horizontal cyclone separator and situated at a position to receive the disengaged fine solid catalyst particles by the centrifugal velocity, said horizontal cyclone separator being in interconnection with a vertical downcomer conduit at a locus substantially opposite to said interconnection of said horizontal cyclone separator with said tubular reactor with respect to the horizontal axis of said horizontal cyclone separator, said vertical downcomer conduit positioned to receive a minor portion of the fine solid catalytic particles disengaged via secondary centrifugal separation, wherein said horizontal cyclone separator and tubular reactor are constructed such that a vortex comprising a helical flow path of gaseous hydrocarbon materials extends from said second side wall to said gaseous hydrocarbon materials outlet in said first side wall, the helical flow having a swirl ratio greater than 0.2, said swirl ratio being defined by the tangential velocity of the hydrocarbonaceous materials across the cross section of said tubular elongated riser divided by the superficial axial velocity of the hydrocarbonaceous material across the cross section of said gaseous hydrocarbonaceous materials outlet, where maintaining said swirl velocity at greater than 0.2 is sufficient to form a vortex of hydrocarbonaceous materials in said horizontal cyclone separator wherein said inclined slot solid dropout means forms a continuous opening along the entire bottom of said horizontal cyclone separator and wherein said off center inlet, said gaseous hydrocarbon materials outlet and said imperforate second side wall are situated to provide that the gaseous hydrocarbon materials entering through said off center inlet pass into said horizontal cyclone separator to said imperforate second side wall and reverse flow in the opposite direction to traverse said horizontal cyclone and then exit said horizontal cyclone separator at the gaseous hydrocarbon materials outlet in the first side wall; and (c) a stripping zone having a stripping gas inlet means and containing a relatively dense bed of solid line catalytic particles having a highest level and being received from both (1) said primary mass flow separation via said inclined slot solid dropout means and (2) said secondary centrifugal separation via said vertical downcomer conduit, said stripping zone interconnecting a downstream catalytic particle regeneration zone and said vertical downcomer conduit, wherein stripping gas is passed to said stripping zone by means of said stripping gas inlet means and wherein the helical flow path of the hydrocarbonaceous materials extending from said second side wall to said gaseous hydrocarbon materials outlet in said first side wall prohibits at least a portion of the stripping gas from passing upward through said vertical downcomer conduit and into said horizontal cyclone separator.

5. The apparatus of claim 4 wherein said imperforate second side wall of said horizontal cyclone separator has attached thereto a vortex flow stabilizer comprising a conical configuration with a pointed end of said conical configuration opposite the end interconnecting said imperforate second side wall.

6. The apparatus of claim 5 wherein said conical configuration is in the shape of a cone or obelisk around which the helical flow path of the gaseous hydrocarbon materials is formed.

7. The apparatus of claim 4 wherein said stripping gas inlet means comprises a multiple number inlet ports at least one of which is located below the highest level of said dense phase of catalyst.

8. The apparatus of claim 4 wherein said inclined slot solid dropout means communicates directly with a lower portion of said vertical downcomer conduit juxtaposed to interconnection of said downcomer conduit with said stripping zone.

9. A reactor and separator apparatus for the separation of solid catalytic particles and a fluid phase comprising reactants and products which apparatus comprises:

(a) a horizontal elongated vessel having a diameter, a body comprising a top having a center line, a first imperforate side wall, a bottom and a perforate second side wall for penetration of a fluid phase outlet withdrawal conduit;

(b) an elongated downflow tubular reactor having a cross section and interconnecting a portion of said top of said horizontal elongated vessel at a position adjacent said perforate second side wall off center from the center line of said top of said vessel defining an off-center ingress as defined by a vertical plane passing through the diameter of said horizontal body, for passage of an admixture of the solid catalytic particles and the fluid phase in a downward direction through said tubular reactor into said horizontal elongated vessel;

(c) a downcomer elongated relatively vertical conduit interconnecting said horizontal elongated vessel bottom adjacent said first imperforate side wall of said horizontal elongated vessel opposite interconnection of said horizontal elongated vessel top with said elongated downflow tubular reactor for passage downward through said downcomer vertical conduit of a relatively small amount of the solid phase;

(d) a fluid phase outlet withdrawal conduit having a diameter cross section and situated in said perforate second side wall of said vessel beneath and to the side of said interconnection of said elongated downflow tubular reactor with said top of said horizontal elongated vessel for the continuous removal of the fluid phase after a secondary centrifugal separation from the solid catalytic particles;

(e) an inclined slot solid dropout means interconnecting said downcomer vertical conduit and said bottom of said vessel at a position at least 90° separated from said downflow tubular reactor interconnection with said top of said vessel as measured by the angle around the circumference of said vessel where 360° equal one complete revolution around said circumference, said dropout means designed to form a continuous opening along the entire bottom of said horizontal vessel and to receive solid catalyst particles by primary mass separation of solid catalyst particles from the fluid phase by centrifugal acceleration of the solid catalyst particles about said angle of at least 90° in said horizontal vessel, wherein the solid particles are accelerated against said horizontal body to cause primary mass flow separation and to pass the majority of the solid catalyst particles through said inclined solid dropout means to said downcomer vertical conduit; and (f) wherein said withdrawal conduit, horizontal elongated vessel and said downflow tubular reactor are constructed to insure that the diameter of said withdrawl conduit is smaller than the diameter of said horizontal elongated vessel and said off center ingress of said admixture of said solid particles and fluid phase develop a swirl ratio of greater than 0.2 defined by the tangential velocity of the fluid across the cross section diameter of said tubular reactor divided by the superficial axial velocity of said fluid through the cross section of said withdrawal conduit sufficient to form a vortex of the fluid phase in a helical path of fluid which passes through said horizontal vessel to said first imperforate side wall and reverse the flow path of the fluid phase in the opposite direction to said withdrawal conduit and wherein the helical flow path extends from said imperforate side wall opposite said fluid withdrawal conduit to exit through said fluid withdrawal conduit to cause said secondary centrifugal separation and disengagement of entrained solid catalyst particles from the fluid phase and passage of the disengaged solid particles to the point of interconnection of said horizontal vessel with said downcomer vertical conduit and to thereby pass the disengaged and separated solid particles through said downcomer conduit.

10. The apparatus of claim 9 wherein said horizotnal elongated vessel includes a vortex stabilizer in attachment with said first imperforate side wall to stabilize the helical flow of the fluid phase in a direction towards said fluid withdrawal conduit.

* * * * *